United States Patent Office 3,187,058
Patented June 1, 1965

---

3,187,058
PRODUCTION OF FLUORINATED COMPOUNDS
Colin Russell Patrick, Maurice Stacey, and John Colin Tatlow, all of Edgbaston, Birmingham, England, assignors to National Research Development Corporation, London, England, a British corporation
No Drawing. Filed Oct. 19, 1961, Ser. No. 146,353
Claims priority, application Great Britain, Oct. 26, 1960, 36,735/60
4 Claims. (Cl. 260—651)

The present invention relates to highly fluorinated organic compounds. It is concerned with the manufacture of unsaturated highly fluorinated compounds by a defluorination reaction which may be the only known method of preparing certain new compounds or an alternative and generally easier method of preparing already known compounds.

We have now discovered that highly fluorinated organic compounds (in particular, fully fluorinated compounds) containing a normal relatively stable saturated linkage between two carbon atoms, each having attached fluorine atoms, may be defluorinated to a corresponding relatively unsaturated compound containing an ethylenic unsaturated linkage between the said two carbon atoms. The defluorination reaction is accomplished by contacting the compound at a high temperature e.g. from 600°–650° C. in the vapour state with a reactive metal which is capable of forming a stable fluoride.

The process may be carried into effect either in a static system or more conveniently by passing the vapour of the material to be defluorinated in a continuous stream borne by an inert carrier gas over heated pieces of gauze, wire, turnings or powder of metals such as nickel, iron, cobalt or copper, whose fluorides are stable and non-volatile. The metal surface must be clean and uncontaminated and, as after some use the activity of the metal diminishes as metal fluoride is formed, the metal surface must be restored to activity by reducing the fluoride, for example, with hydrogen.

One example of a defluorination process in accordance with the invention is the formation of highly fluorinated alkenyl benzenes such as perfluorostyrene from the corresponding highly fluorinated alkyl benzenes. Perfluorostyrene is a new compound of formula $C_6F_5-CF=CF_2$.

The production of perfluorostyrene which is useful as a chemical intermediate and as a monomer for the production of perfluoro-polymers will now be described by way of example.

Perfluoroethylbenzene (2.9 g.) is passed in a stream of nitrogen (2 litres/hour) over steel Dixon gauzes packed in a 1 inch diameter steel tube 2 feet 6 inches long. The central portion (about 10 inches) of the tube is contained in a furnace heated to 600° C. The products (1.6 g.) are collected in a trap immersed in liquid air and are separated by preparative gas chromatography to give perfluoroethylbenzene (0.9 g.) and perfluorostyrene (0.25 g., a 15% yield) having a boiling point at 121° C. (determined by the capillary tube method).

Perfluorostyrene may be identified by mass spectrometry, infra-red and ultra-violet spectrometry and by its ease of oxidation to pentafluorobenzoic acid.

The defluorination procedure described above may also be carried out with other perfluoro lower alkyl aromatic compounds in which an aromatic ring has attached to it the groupings $-CF_2-CF_2$ or

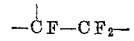

and also analogous compounds in which the aromatic ring is unsubstituted or not fully substituted at other positions by fluorine radicals.

We claim:
1. A process for the production of polyfluorinated aromatic compounds having a perfluorinated ethylene side chain which comprises heating a compound of the formula $Ar-CF_2-CF_3$ wherein Ar represents a polyfluorinated aromatic ring in contact with a metal reactive with fluorine to produce a stable fluoride at a temperature between about 600–650° C. until a substantial quantity of a polyfluorinated aromatic compound having a perfluorinated ethylene side chain is formed.
2. The process of claim 1 in which the compound of the formula $Ar-CF_2-CF_3$ is perfluoroethylbenzene and the polyfluorinated aromatic compound having a perfluorinated ethylene side chain produced is perfluorostyrene.
3. The process of claim 1 in which said metal is selected from the group consisting of copper, nickel, iron and cobalt.
4. The process of claim 1 in which the surface of the metal is regenerated intermittently by reducing the metal fluoride formed.

References Cited by the Examiner
UNITED STATES PATENTS

| | | | |
|---|---|---|---|
| 2,612,528 | 9/52 | Cohen | 260—650 |
| 2,689,241 | 9/54 | Dittman et al. | 260—650 |
| 3,006,727 | 10/61 | Ruh et al. | 260—653.5 X |

FOREIGN PATENTS 1,240,807  2/59  France.

OTHER REFERENCES

Gething et al.: "Nature," vol. 183, Feb. 28, 1959, pp. 588–9.

LEON ZITVER, *Primary Examiner.*

ALPHONSO D. SULLIVAN, *Examiner.*